Patented May 4, 1943

2,318,304

UNITED STATES PATENT OFFICE 2,318,304

OITICICA OIL PRODUCT

Henry A. Gardner, Jr., Bethesda, Md.

No Drawing. Application December 5, 1941,
Serial No. 421,846

13 Claims. (Cl. 260—19)

The present invention relates to the provision of drying oil compositions derived from oiticica oil by reaction thereof with castor oil.

Prior investigators have established that oiticica oil contains a ketonic unsaturated acid for which the name "licanic" acid has been proposed (Brown and Farmer, Biochem. Jour. vol. 29 (1935), 631-9). In an article in "Paint and Varnish Production Manager," vol. 14, No. 6, pp. 16–18, 30, I referred to the presence of unsaturated ketonic acids in oiticica oil, and to experiments which I had made to show the reactivity of these acids with such substances as cresol, various phenols, phthalic anhydride, diphenyl, chlorinated diphenyl, beta naphthol, urea, thymol, benzoic acid, formaldehydes, etc., in the presence of small amounts of phosphoric acid as a catalyst. Vigorous reactions, with elimination of water, were observed in the cases of some of the mentioned substances when treated with oiticica oil.

I have now found substances which seem more commercially applicable to this general reaction. They are the dehydroxylated glycerides or acids of castor oil, which seem to unite very readily with oiticica oil to produce the novel drying oil compositions of the present invention.

The following specific examples illustrate the process.

Example 1

500 parts by weight of raw castor oil and 500 parts by weight of raw oiticica oil were placed in a vessel, and there was added 2 to 10 parts by weight of an acidic substance such as sodium acid sulphate (NaHSO4) as activating agent. The mixture was progressively heated. At 100° C. some indication of moisture evolution was indicated, but at approximtely 150° C. there was a violent ebullition, and water was expelled. Apparently at this point of the reaction a combination occurred between the nascently dehydroxylated castor oil and the dehydrated oiticica oil. By continuing the reaction up to about 250° C., water was expelled to the amount of about 25 parts by weight or more. At a temperature of about 280° C., the reaction apparently was complete, no more water being given off. At this point the composition had become very viscous, apparently due to the reaction between the two oils.

Example 2

1000 parts by weight of raw castor oil was treated with from 2 to 10 parts by weight of an acidic substance such as sodium acid sulphate. The process of dehydroxylation was carried on, with progressive heating, until a temperature of approximately 250° C. was reached, at which point there had been distilled off approximately 4% of water. 1000 parts by weight of oiticica oil was then introduced, the temperature dropping to about 150° C. The temperature of the mixture was then gradually brought up to 280° C., during which interval there was a further evolution of water—usually in the neighborhood of 2%. Apparently intense reactions occurred during this period, as the composition became very viscous. It is believed that a condensation between the dehydroxylated molecule of the castor oil and the ketonic group of the oiticica oil occurred. At a temperature of 280° C. the reaction apparently was complete, and the composition was allowed to cool.

The course of the reaction involved in the above examples is not substantially altered by the substitution of another acid sulphate, e. g., potassium acid sulphate, for the catalytically-acting sodium acid sulphate, the —HSO4 group being the activating agent.

Drying oil compositions produced in the above fashion have very distinct characteristics as compared to either of the starting materials from which they are made. For instance, I present, in the table below, the approximate characteristics of raw and of dehydroxylated castor oil, of raw or ordinary heat-treated oiticica oil, and of a drying oil composition illustrative of the present invention:

|  | Specific gravity | Refractive index | Viscosity poises | Iodine value | Acid value | Dried film |
|---|---|---|---|---|---|---|
| Raw oiticica oil | .965 | 1.514 | 4.00 | 146.0 | 3 | Opaque wrinkled. |
| Raw castor oil | .955 | 1.475 | 3.7 | 80 | 3 | No dry. |
| Bodied oiticica oil | Min. .978 | 1.510 | 10-18 | Min. 135 | Max. 8 | Opaque wrinkled. |
| Bodied dehydroxylated castor oil | .956 | 1.487 | 1.5-22.7 | 110 | 5 | Semi-opaque wrinkled. |
| The new drying oil composition | .962 | 1.496 | 10.9 or greater | 144 | 6.8 | Clear smooth. |

As will be seen, the new drying oil composition of the invention, produced as described above, has distinct characteristics, quite different from those of either one of the products from which it was made. For instance, either raw or heat-treated oiticica oil, or ordinary dehydroxylated castor oil, will usually dry to a wrinkled, cloudy film, whereas the new drying oil composition dries to a perfectly smooth and clear, tough film in a short period of time. In making such drying tests, I, of course, incorporate with any one of the oils mentioned above about 5 percent of ordinary liquid paint drier. I also find that the new product has greater durability, when used in making varnish, than either or both of the oils per se. It seems to be extremely reactive with phenolic or modified phenolic resins. Even with ester gum or rosin, the new drying oil composition produces varnishes which have greater durability than when either one of the oils (from which the same was produced) is used alone, or in mere physical admixture with the other, as the drying oil component of the varnish.

It is, of course, old to dehydroxylate castor oil in the presence of catalysts. This has been done for many years, to produce better drying products. Therefore, I disclaim the dehydroxylation of castor oil per se, as my new product depends not merely upon dehydroxylation but rather upon other reactions of a profound nature, as indicated in the above description.

It is to be understood that the invention is not restricted to the employment of equal parts by weight of the oiticica oil and of the castor oil. Thus, for each 100 parts of oiticica oil I may use from about 50 to about 200–250 parts (by weight) of the castor oil without materially altering the varnish-making properties of the resulting drying oil composition.

I claim:

1. Process of improving the varnish-making properties of oiticica oil, which comprises reacting the same with dehydroxylated castor oil at a temperature of from about 250° to about 280° C., in the presence of an acid sulphate activating agent.

2. Process of producing a drying oil composition, which comprises progressively heating a mixture of oiticica oil and raw castor oil, in the presence of an acid sulphate as activating agent, to a top temperature of the order of 280° C.

3. The process of producing a drying oil composition, which comprises admixing from about one-half to about two and one-half parts by weight of raw castor oil with one part of oiticica oil, and progressively heating the mixture, in the presence of an acid sulphate catalyst, to a top temperature of the order of 280° C.

4. Process of producing a drying oil composition, which comprises admixing oiticica oil with about an equal part by weight of raw castor oil, and progressively heating the mixture, in the presence of an acid sulphate catalyst, to a top temperature of the order of 280° C.

5. Process which comprises dehydroxylating castor oil, adding oiticica oil to the freshly dehydroxylated castor oil, and heating the resulting mixture, in the presence of a condensation catalyst, to a top temperature of at least 250° C. and until substantially no more water is given off.

6. Process of producing a drying oil composition, which comprises condensing oiticica oil with castor oil by progressively heating a mixture consisting essentially of said oils and a small but effective amount of a catalytically acting acid sulphate to a final temperature of at least 250° C.

7. Process which comprises reacting approximately equal parts by weight of oiticica oil and dehydroxylated castor oil, in the presence of an acid sulphate catalyst, and progressively heating the reaction product to a top temperature of at least 250° C. whereby the latter is condensed.

8. The drying oil product produced by reacting together, at a temperature of from about 250° to about 280° C., in the presence of a small amount of an acid sulphate activating agent, dehydroxylated castor oil and oiticica oil.

9. A drying oil composition consisting essentially of the condensation product produced by progressively heating a mixture of oiticica oil and dehydroxylated castor oil to a top temperature of at least 250° C.

10. The drying oil composition produced by progressively heating one part of oiticica oil with from about one-half to about two and one-half parts of nascently dehydroxylated castor oil in the presence of an acid sulphate catalyst to a top temperature of at least 250° C.

11. The drying oil composition produced by progressively heating oiticica oil with about an equal part by weight of nascently dehydroxylated castor oil in the prescence of an acid sulphate catalyst to a top temperature of at least 250° C.

12. A varnish consisting essentially of a solution of a resin in a pre-formed drying oil composition composed of the condensation product of oiticica oil and nascently dehydroxylated castor oil produced by progressively heating a mixture of said oils, in the presence of an acid sulphate catalyst to a top temperature of at least 250° C.

13. A varnish consisting essentially of a solution of an oil-soluble phenolic resin in a pre-formed drying oil composition composed of the condensation product of oiticica oil and nascently dehydroxylated castor oil produced by progressively heating a mixture of said oils, in the presence of an acid sulphate catalyst to a top temperature of at least 250° C.

HENRY A. GARDNER, Jr.